A. HOMANN.
NUT LOCKING TOOL.
APPLICATION FILED NOV. 8, 1920.
1,407,276.
Patented Feb. 21, 1922.
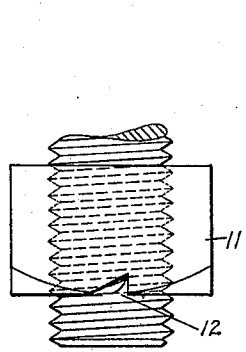
FIG. 7.
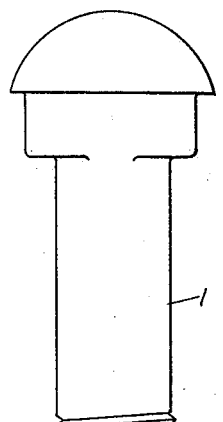
FIG. 1.
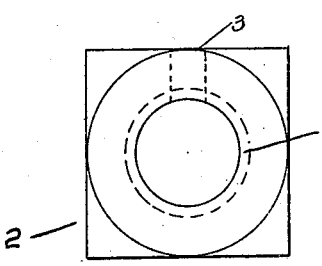
FIG. 5.
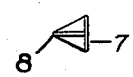
FIG. 6.
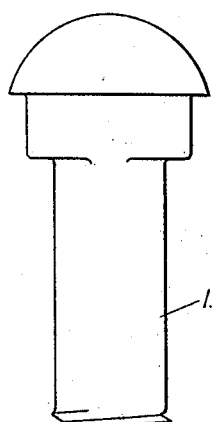
FIG. 2.
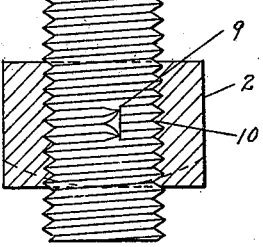
FIG. 3.
FIG. 4.
INVENTOR
Albert Homann
by William B. Wharton
his attorney

UNITED STATES PATENT OFFICE.

ALBERT HOMANN, OF PITTSBURGH, PENNSYLVANIA.

NUT-LOCKING TOOL.

1,407,276.  Specification of Letters Patent.  Patented Feb. 21, 1922.

Application filed November 8, 1920. Serial No. 422,417.

*To all whom it may concern:*

Be it known that I, ALBERT HOMANN, a citizen of the United States, and resident of Pittsburgh, in the county of Allegheny and State of Pennsylvania, have invented a new and useful Improvement in a Nut-Locking Tool, of which the following is a specification.

This invention relates to a nut lock.

The object of the invention is to provide an arrangement for locking a nut on a bolt, the operating parts of which are comprised in the nut and bolt themselves and may be readily provided during manufacture of the nut.

A further object of the invention is to provide an arrangement securing a nut on a bolt, which permits the nut to be readily removed from or tightened on the bolt.

In the accompanying drawings Figure 1 is an elevation of the nut and bolt of the present invention; Figure 2 is an elevation of the bolt showing the nut in section thereon, and illustrating the deformation of the bolt threads for locking the bolt in position; Figure 3 is a plan view of the nut; Figure 4 is a horizontal section through the nut illustrating the operation of deforming the bolt threads; Figure 5 is an elevation of the tool for deforming the bolt threads; Figure 6 is a bottom plan view of this tool; and Figure 7 is an elevation illustrating a modified form of nut.

As shown in the drawings, the bolt 1, in its original condition, may be of any usual or standard form. The nut 2, however, as shown in Figures 1, 3, and 4 of the drawings is provided part way of its width with an orifice 3 exposing one or more of the threads 4 on the bolt 1 which are included within the limits of the nut when in position on the bolt. This orifice 3 gives access to the threads for the purpose of deforming such threads.

The tool 5 provides preferred means for performing this thread deforming operation. This tool comprises a shank 6, a cutting edge 7 at one extremity of the shank, and a spreading flange 8 joining the cutting edge and disposed substantially at right angles thereto. This spreading flange 8 is preferably formed, as shown, by cutting away the metal of the triangular shank to leave a thin edge capable of reaching to the base of the threads and increasing in width upwardly of the tool and toward the cutting edge 7. The cutting, or knife edge, of the tool in conjunction with this form of spreading flange permits the threads to be cleanly cut and spread without injury to the metal of the threads.

The shank 6 of the deforming tool 5 is preferably triangular in cross section and the orifice 3 is of similar form, so that the tool has a sliding but relatively close fit in the orifice. This form of shank and orifice exposes the threads to be cut with the least possible removal of metal from the nut and conforms to the arrangement of the essential cutting and spreading elements of the tool 5.

For deforming the bolt threads, tool 5 is inserted through orifice 3 and its upper extremity hammered. This causes the cutting edge 7 to cut across two threads and the flange 8 to spread these threads adjacent the point at which they are cut, thus forming spurs 9 as shown in Figure 2 of the drawings. This deformation of the threads 4 effectually prevents rotation of the nut 2 in a direction to unscrew the nut from the bolt, thus securing the nut against accidental displacement due to jolts, jars, vibration, or expansion. For removing the nut from the bolt, force is exerted to screw the nut further along the shank of the bolt 1. This causes the nut threads 10 to force the spurs of metal 9 back into position and straighten out the threads 4 which have been cut. The nut 2 may then be rotated in a direction to remove the nut from the bolt or to loosen it thereon.

In order to tighten the nut on the bolt, it is merely necessary to rotate the nut in a direction to move it further therealong, the spurs 9 being forced back into position during progress of the nut. The nut may then be locked in its new position by again inserting and hammering upon the tool 5, thus causing a second deformation of the bolt threads 4.

It will be readily appreciated that the lock of the present invention is particularly adapted for use in connection with railway and other heavy work of a generally similar nature. For railway use it is of great importance that the nut may be readily tightened from time to time; that the operative locking means are contained in the nut and bolt themselves, thus avoiding the inconvenience of supplying additional parts; and that the lock comprises no parts or elements which are complicated or difficult to manufacture.

In manufacture of the nut, the orifice 3 may be provided by a simple punching operation performed upon the nut. To provide the preferred form of nut shown in Figures 1, 3, and 4, of the drawings, it is merely necessary that the orifice 3 be so disposed as to centrally include one of the nut threads 10, in which case it will, when in position on the bolt, necessarily expose two of the threads 4 of the bolt.

Although the nut lock has been described as employing the cutting and deformation of two threads, it is to be understood that the cutting and deformation of a single thread is sufficient to lock the nut in position. This single thread may also be straightened out equally as well as where two threads are deformed, provided that the deformed thread is in such position with relation to the nut that succeeding nut threads may act upon it when the nut is screwed further along the bolt.

Figure 7 of the drawings illustrates a modified form of nut. This nut 11 is provided with a groove 12 extending along a face of the nut, and arranged to expose the most outwardly disposed bolt thread which is included within the limits of the nut. As noted above, the deformation of one only of the bolt threads is sufficient to prevent accidental displacement of the bolt. It will be seen, however, that rotation of the nut in a direction to screw it further along the bolt, can not with this form cause the nut threads to straighten out the threads of the bolt for permitting loosening or removal of the nut.

As the device is susceptible of a number of further modifications without departing from the spirit of the invention, the scope of the invention is to be restricted only by the limitations contained in the claims appended hereto.

What I claim is:

1. A thread cutting and spreading tool for use in conjunction with a bolt and nut arranged to enter an orifice in the nut and comprising a shank, a cutting edge arranged to cut a bolt thread transversely, and a spreading portion disposed substantially at right angles to the cutting edge and arranged to displace a portion of the thread adjacent the point at which it is cut.

2. A thread cutting and spreading tool for use in conjunction with a bolt and nut, arranged to enter an orifice in the nut and comprising a shank, a cutting edge arranged to cut two bolt threads transversely, and a spreading portion disposed substantially at right angles to the cutting edge and arranged to displace outwardly a portion of both threads adjacent the point at which they are cut.

3. A thread cutting and spreading tool for use in conjunction with a bolt and nut arranged to enter an orifice in the nut and comprising a shank, a cutting edge arranged to cut a bolt thread transversely, and a spreading portion increasing in thickness upwardly from its lower edge and inwardly to the cutting edge of the tool disposed substantially at right angles to the cutting edge.

4. A thread cutting and spreading tool for use in conjunction with a bolt and nut arranged to enter an orifice in the nut and comprising a shank, a cutting edge arranged to cut two bolt threads transversely; and a spreading portion increasing in thickness upwardly from its lower edge and inwardly toward the cutting edge of the tool, disposed substantially at right angles to the cutting edge and arranged to displace outwardly a portion of both threads adjacent the point at which they are cut.

ALBERT HOMANN.

Witnesses:
FLORENCE F. SCHWARTZ,
W. B. WHARTON.